(12) United States Patent
Teter

(10) Patent No.: US 7,852,574 B1
(45) Date of Patent: Dec. 14, 2010

(54) MAGNIFYING LENSED FLASHLIGHT APPARATUS

(76) Inventor: Randy F. Teter, 6871 Jasmine St., Commerce City, CO (US) 80022

(\*) Notice: Subject to any disclaimer, the term of this patent is extended or adjusted under 35 U.S.C. 154(b) by 0 days.

(21) Appl. No.: 12/651,922

(22) Filed: Jan. 4, 2010

(51) Int. Cl.
*G02B 27/02* (2006.01)
*F21L 4/00* (2006.01)

(52) U.S. Cl. ........................ 359/802; 362/190

(58) Field of Classification Search ......... 359/801–814; 362/188, 208, 269, 282, 190–192, 255, 287
See application file for complete search history.

(56) References Cited

U.S. PATENT DOCUMENTS

| | | | | |
|---|---|---|---|---|
| 2,725,788 | A | 12/1955 | Pfleger | 359/803 |
| 4,225,907 | A | 9/1980 | Erdell | 362/255 |
| 4,750,095 | A * | 6/1988 | Huang | 362/190 |
| 4,763,986 | A | 8/1988 | Sego | 359/798 |
| 5,091,803 | A | 2/1992 | Raney | 359/818 |
| 6,525,887 | B1 * | 2/2003 | Tsung-Hui | 359/802 |
| 7,178,938 | B2 * | 2/2007 | Sordjan, Jr. | 362/190 |

\* cited by examiner

*Primary Examiner*—Mohammed Hasan
(74) *Attorney, Agent, or Firm*—Crossley Patent Law; Mark A. Crossley

(57) ABSTRACT

The magnifying lensed flashlight apparatus provides both a flashlight and a magnifying glass. The apparatus enables selective positioning of the magnifying glass, from a position directly atop and flush within to a position 180 degrees forwardly from the apparatus top. Magnifying lens positioning is provided via a thumb slide accompanied by nodules and detents that enabled exact, resisted-movement positioning in 4 positions.

2 Claims, 8 Drawing Sheets

MAGNIFYING LENSED FLASHLIGHT APPARATUS

BACKGROUND OF THE INVENTION

Prior art testifies to the desire and need for a magnifying lens attached to a flashlight. The present apparatus provides such a tool, with the lens selectively positionable, via a thumb slide.

FIELD OF THE INVENTION

The magnifying lensed flashlight apparatus relates to flashlights and more especially to a flashlight with an attached selectively positioned magnifying lens.

SUMMARY OF THE INVENTION

The general purpose of the magnifying lensed flashlight apparatus, described subsequently in greater detail, is to provide a magnifying lensed flashlight apparatus which has many novel features that result in an improved magnifying lensed flashlight apparatus which is not anticipated, rendered obvious, suggested, or even implied by prior art, either alone or in combination thereof.

To attain this, the magnifying lensed flashlight apparatus provides both a flashlight and a magnifying glass. The apparatus enables selective positioning of the magnifying lens, from a lens bed in the apparatus top to a position rotated 180 degrees forwardly form the lens bed, which positions the magnifying lens parallel with the flashlight beam. The apparatus may be provided in any shape, whether round square or other. Magnifying lens positioning is provided via a thumb slide, with nodules slideably fitted within indents of the expanded triangle positioned rearwardly from the apparatus, thereby providing exact control of magnifying lens positioning. The nodule-retained magnifying lens positions provide positive positioning in four positions, and also allow user controlled magnifying lens positioning between those positions. A user can thereby obtain a magnified viewing of various objects from a preferred advantageous positioning of the magnifying lens.

The apparatus can be obtained in basic forms and also in the form illustrated, with cylinder with power source affixed to the neck that is affixed to the expanded rectangle, with the expanded rectangle housing the light source and removably receiving the magnifying lens. The most basic embodiment may have a directly manually operated magnifying lens pivot feature, while the most complete embodiment provides a thumb slide for magnifying lens pivot.

Thus has been broadly outlined the more important features of the improved magnifying lensed flashlight apparatus so that the detailed description thereof that follows may be better understood and in order that the present contribution to the art may be better appreciated.

An object of the magnifying lensed flashlight apparatus is to provide both a flashlight and a magnifying glass.

Another object of the magnifying lensed flashlight apparatus is to enable selective positioning of the magnifying glass.

A further object of the magnifying lensed flashlight apparatus is to provide magnifying lens positioning via a thumb slide.

These together with additional objects, features and advantages of the improved magnifying lensed flashlight apparatus will be readily apparent to those of ordinary skill in the art upon reading the following detailed description of presently preferred, but nonetheless illustrative, embodiments of the improved magnifying lensed flashlight apparatus when taken in conjunction with the accompanying drawings.

In this respect, before explaining the current embodiments of the improved magnifying lensed flashlight apparatus in detail, it is to be understood that the magnifying lensed flashlight apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved magnifying lensed flashlight apparatus. It is therefore important that the claims be regarded as including such equivalent constructions insofar as they do not depart from the spirit and scope of the magnifying lensed flashlight apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 7D thereof, the principles and concepts of the magnifying lensed flashlight apparatus generally designated by the reference number 10 will be described.

Figure 1:
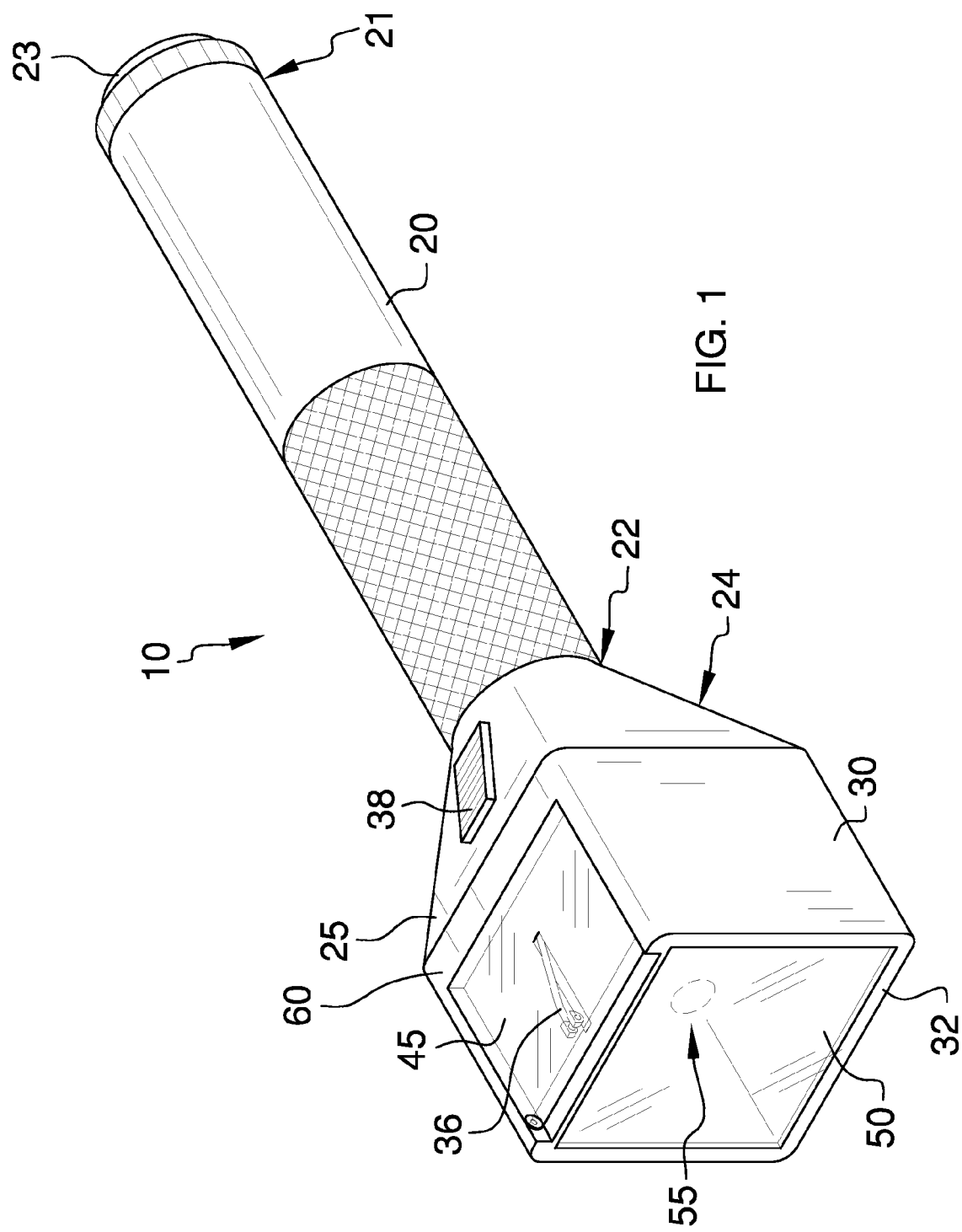
FIG. 1 is a top perspective view.
Figure 2:
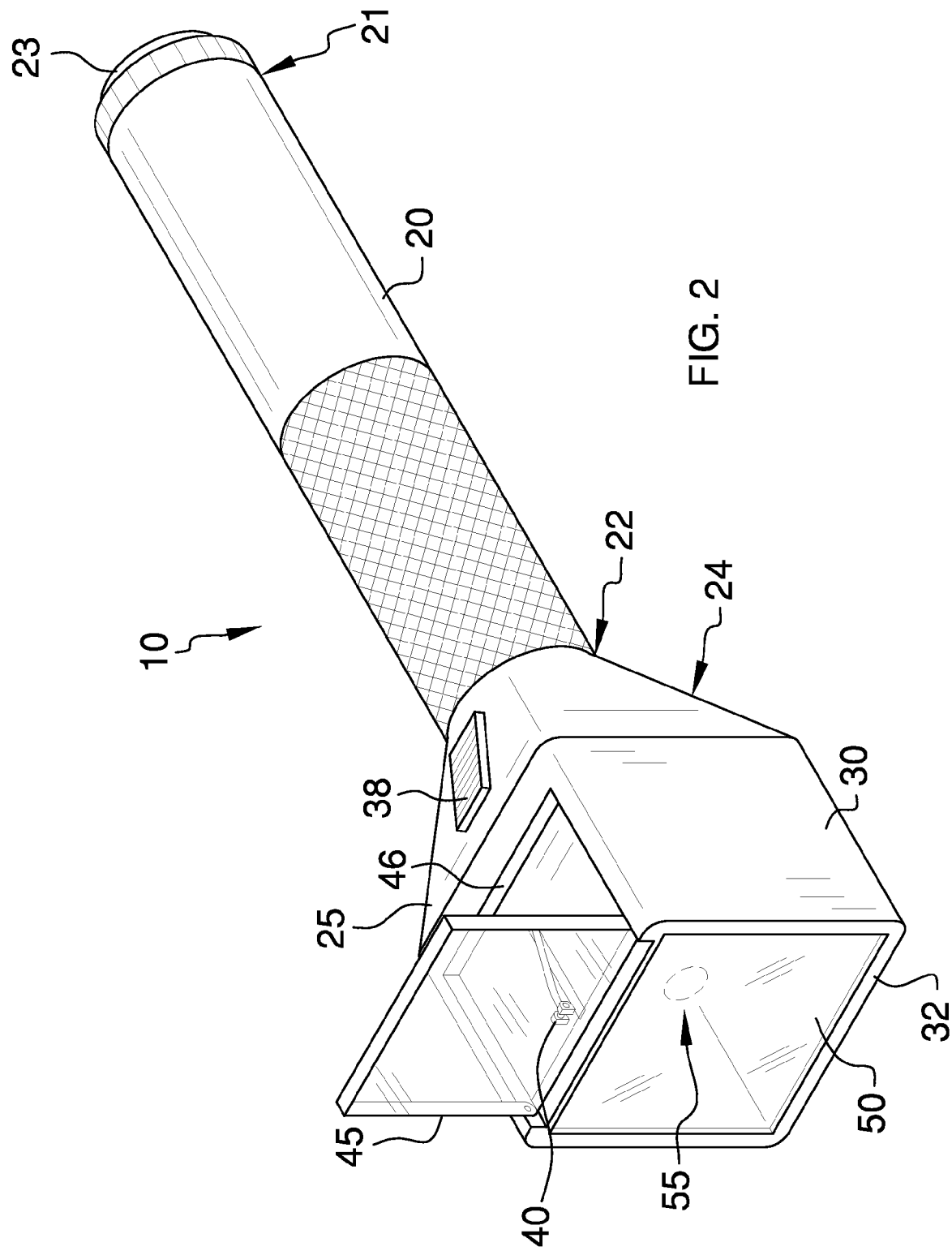
FIG. 2 is a top perspective view with magnifying lens positioned vertically.
Figure 3:
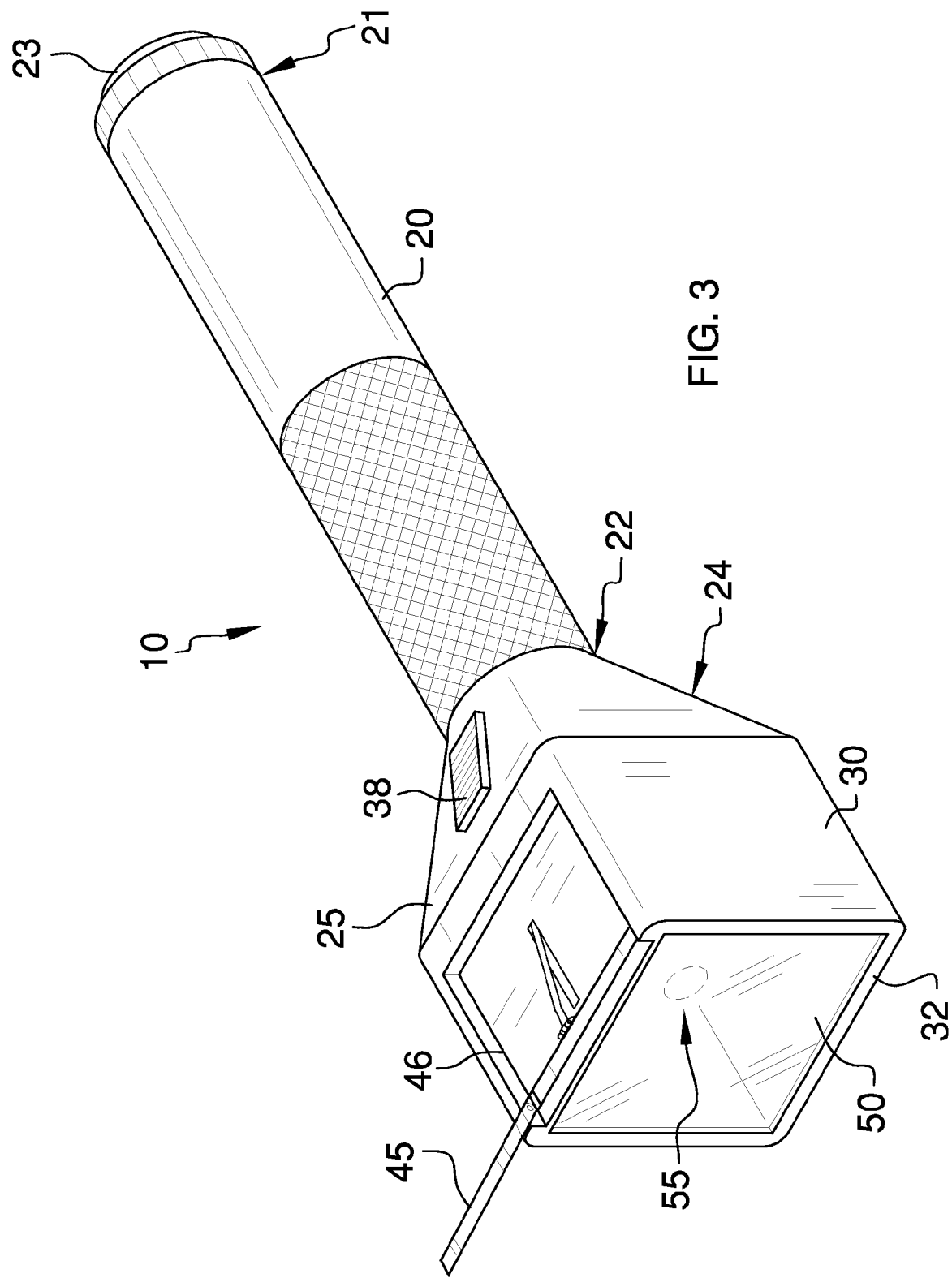
FIG. 3 is a top perspective view with magnifying lens rotated upwardly and forwardly 135 degrees from the lens bed of the top of the rectangular sleeve.

Referring to FIGS. 1, 2, and 3, the apparatus 10 partially comprises a top 60. The apparatus 10 has a cylinder with power source 20 having a first end 21 spaced apart from a second end 22. The removable switch cap 23 is disposed on the first end 21 and provides access to the interior of the cylinder 20 as well as on/off light control. The neck 24 is disposed on the cylinder 20 second end 22. The neck 24 is tapered outwardly from the cylinder 20 to end in an expanded rectangle 25.

Figure 7A:
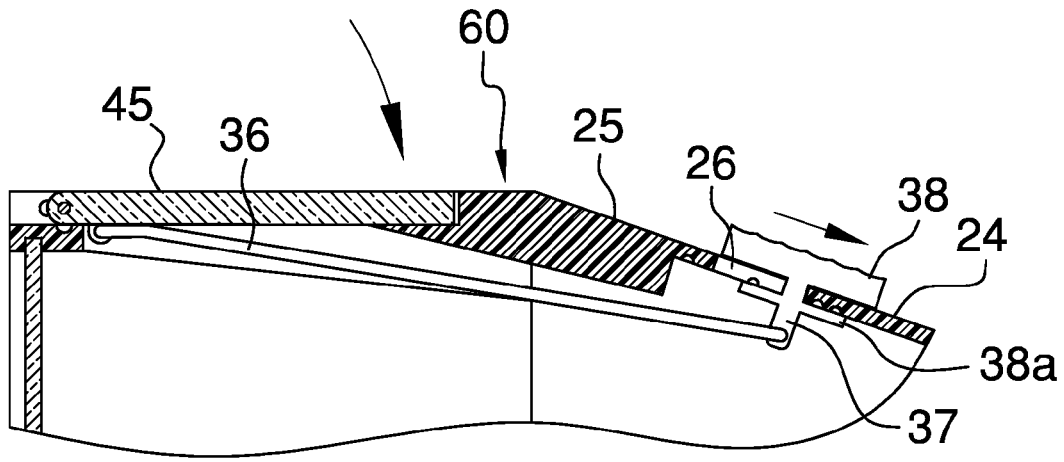
FIG. 7A is a partial cross sectional view of FIG. 5, taken along the line 7-7, with magnifying lens within the lens bed.

Referring to FIG. 7A, the slot 26 is disposed in the neck 24 top 60.

Referring again to FIG. 6, the rectangular sleeve 30 is extended from the expanded rectangle 25. The rectangular perimeter face 32 ends the sleeve 30. The light lens 50 is disposed within the perimeter face 32. The light source 55 is disposed behind the light lens 50. The light source 55 is in communication with the cylinder with power source 20. The rectangular lens bed 46 is disposed within the sleeve 30 top 60.

Figure 7B:
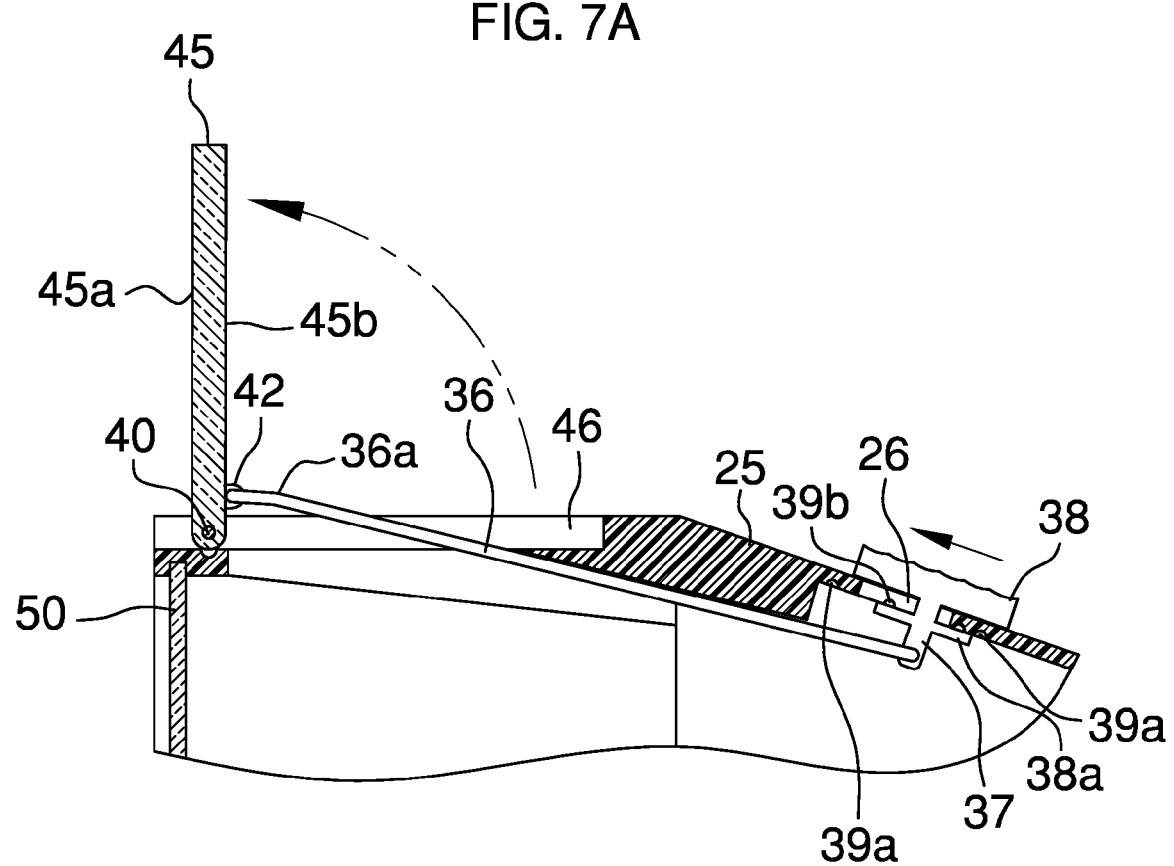
FIG. 7B is a partial cross sectional view of FIG. 5, taken along the line 7-7, with magnifying lens positioned vertically.

Referring to FIG. 7B, the rectangular magnifying lens 45 is pivotally and removably disposed within the lens bed 46. The magnifying lens 45 has a lens front 45a and a lens back 45b.

Referring again to FIGS. 6 and 7B, the lever post 42 is disposed downwardly and centrally on the lens back 45b. The longitudinal slot 26 is disposed within the neck 24. The plurality of spaced apart indents 39a is disposed downwardly in the neck 24. The indents 39a are disposed both forward and aft of the slot 26. The thumb slide 38 is slideably disposed above the slot 26. The connection arm 37 is disposed downwardly and centrally from the thumb slide 38 and through the slot 26. The connection arm 37 is perpendicular to the thumb slide 38. The lower slide 38a is disposed perpendicularly on the connection arm 37. The lower slide 38a is disposed below the slot 26. The plurality of nodules 39b is disposed upwardly on the lower slide 38a. The nodules 39a are selectively engaged within the indents 39a. The thumb slide 38 thereby resists inadvertent movement with nodules 39a engaged within indents 39a.

Figure 7C:
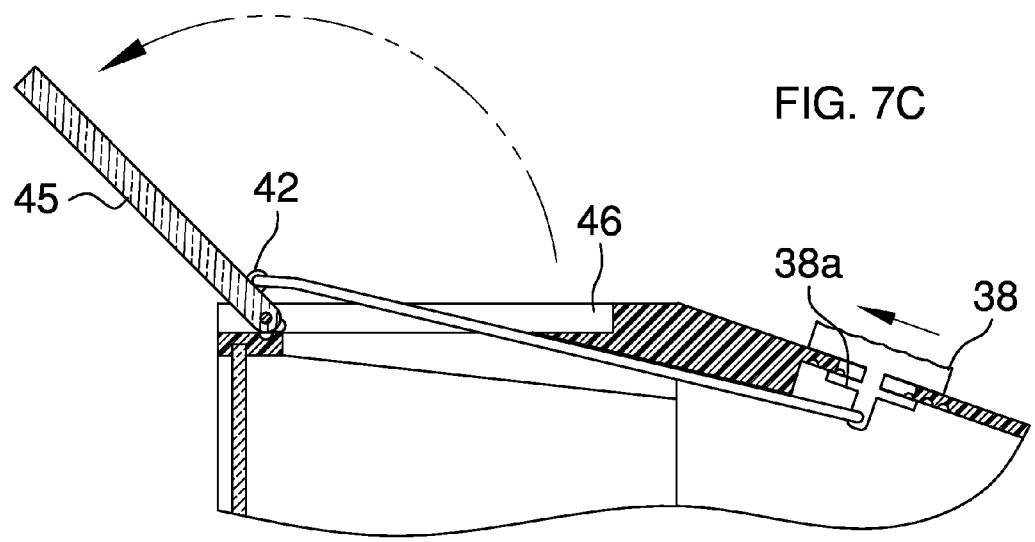
FIG. 7C is a partial cross sectional view of FIG. 5, taken along the line 7-7, with magnifying lens rotated forwardly from the lens bed by 135 degrees.
Figure 7D:
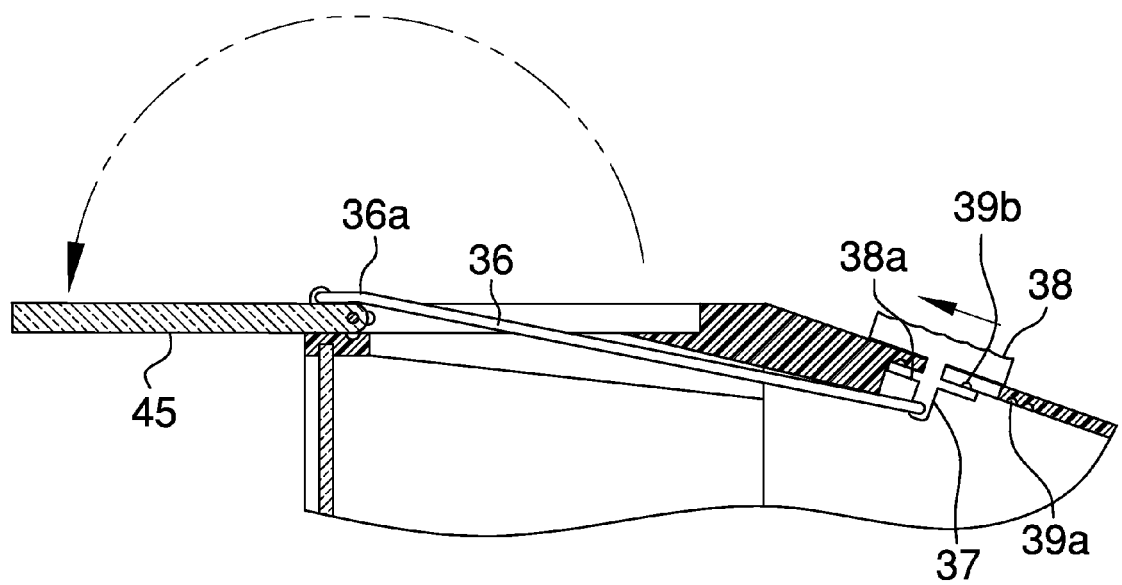
FIG. 7D is a partial cross sectional view of FIG. 5, taken along the line 7-7, with magnifying lens rotated forwardly from the lens bed by 180 degrees.

Referring again to FIGS. 7A and 7B and referring also to FIGS. 7C and 7D, the rod 36 is extended forwardly from the connection arm 37. The rod 36 is connected below the lower slide 38a. The rod 36 is further pivotally connected to the magnifying lens 45 hinge 40. The rod bend 36a is disposed within the rod 36. The rod bend 36a is proximal to the hinge 40 and provides for the rod 36 to engage the magnifying lens 45 with sufficient leverage. Fore and aft movement of the thumb slide 38 pivots the magnifying lens 45 from a position within the lens bed 46 to a position 180 degrees forwardly from the lens bed 46.

Figure 5:
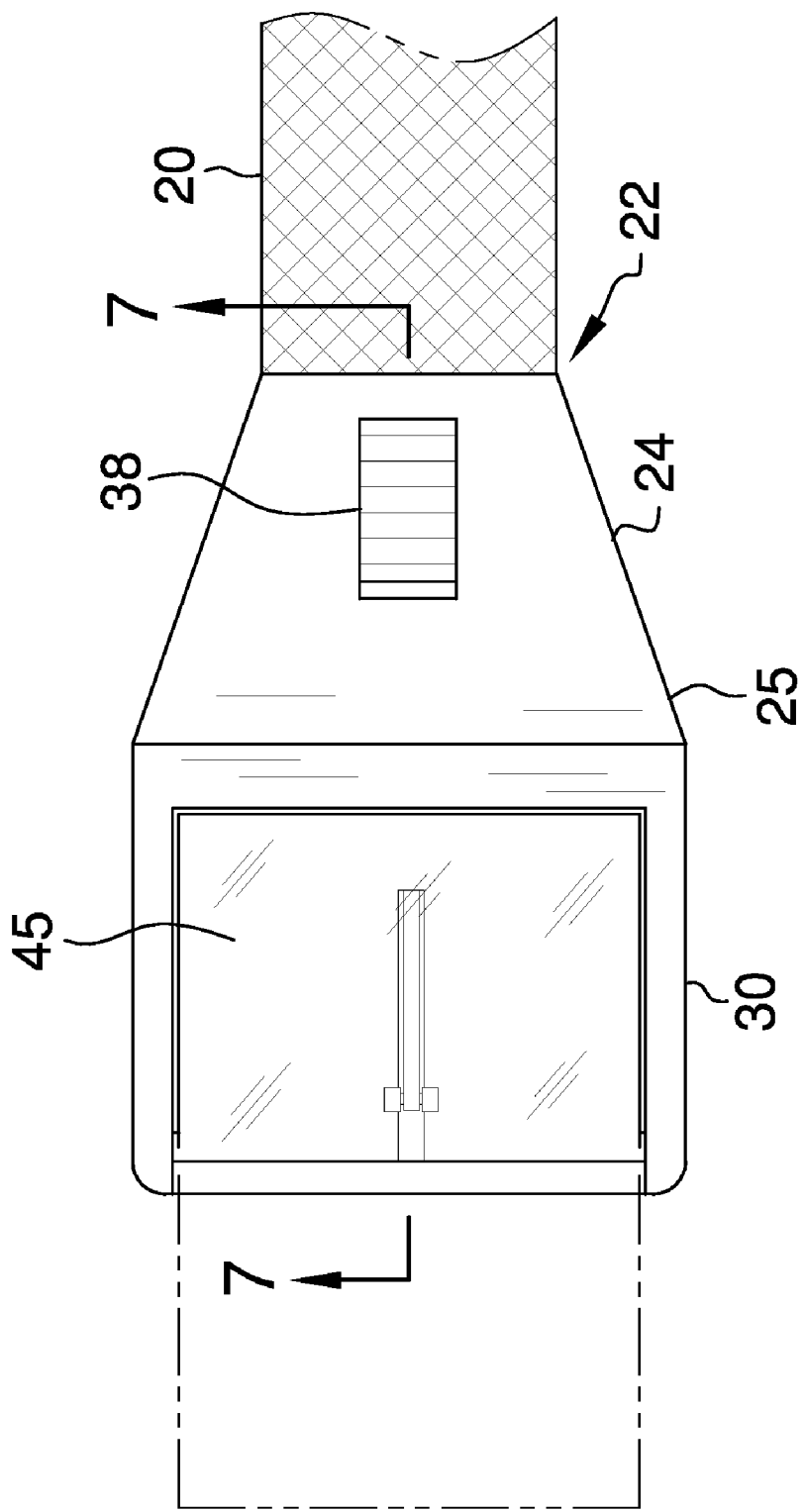
FIG. 5 is a top plan view of the sleeve extended from the expanded rectangle extended from the neck, further illustrating selective positioning capabilities of the magnifying lens.
Figure 6:
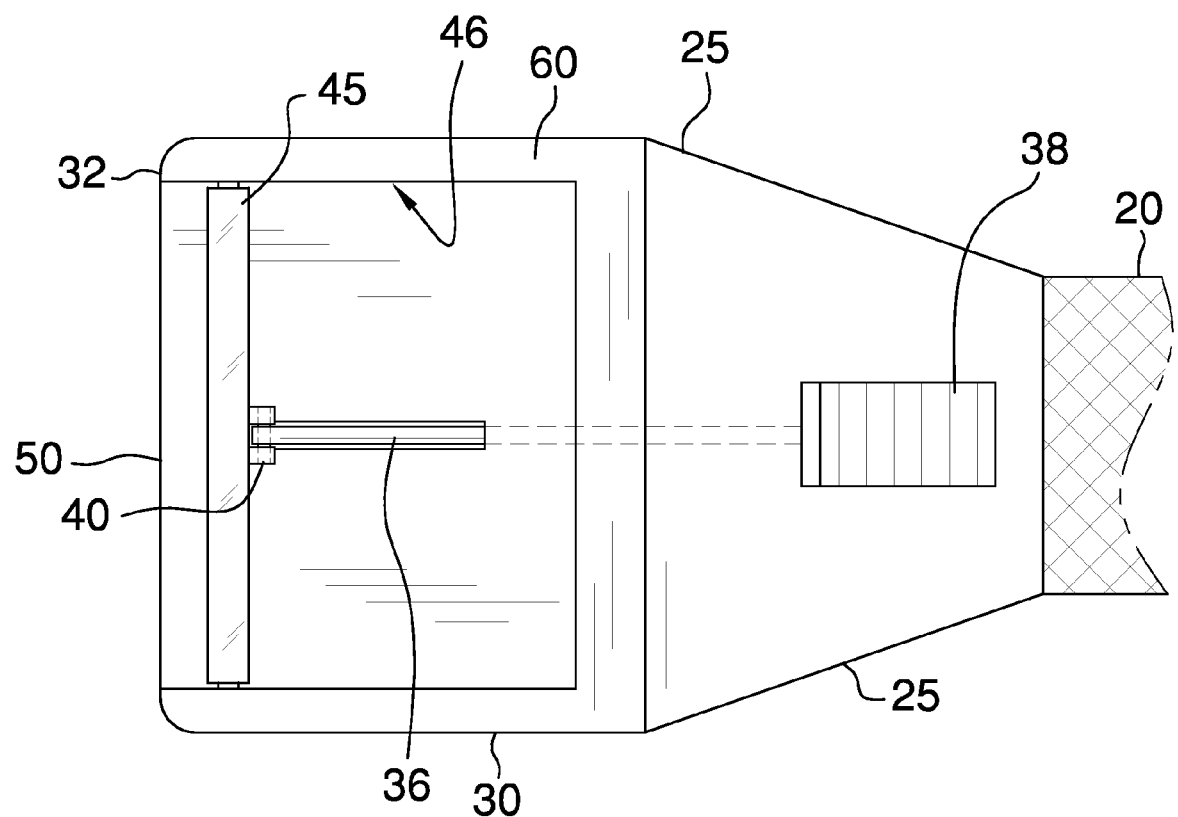
FIG. 6 is top plan view of magnifying lens positioning of FIG. 2.

Referring to FIGS. 5 and 7A, the nodules 39b and indents 39a are engaged with the thumb slide 38 in a rearward or aft position, thereby positioning the magnifying lens 45 within the lens bed 46.

Referring to FIG. 7B, the nodules 39b and indents 39a are engaged with the thumb slide 38 in a slightly forward position, thereby positioning the magnifying lens 45 in an upwardly vertical position, 90 degrees pivoted from the lens bed 46.

Referring to FIG. 7C, the nodules 39b and indents 39a are engaged with the thumb slide 38 in a mid position, thereby positioning the magnifying lens 45 a full 45 degrees forward of vertical or 135 degrees forwardly pivoted from the lens bed 46.

Figure 4:
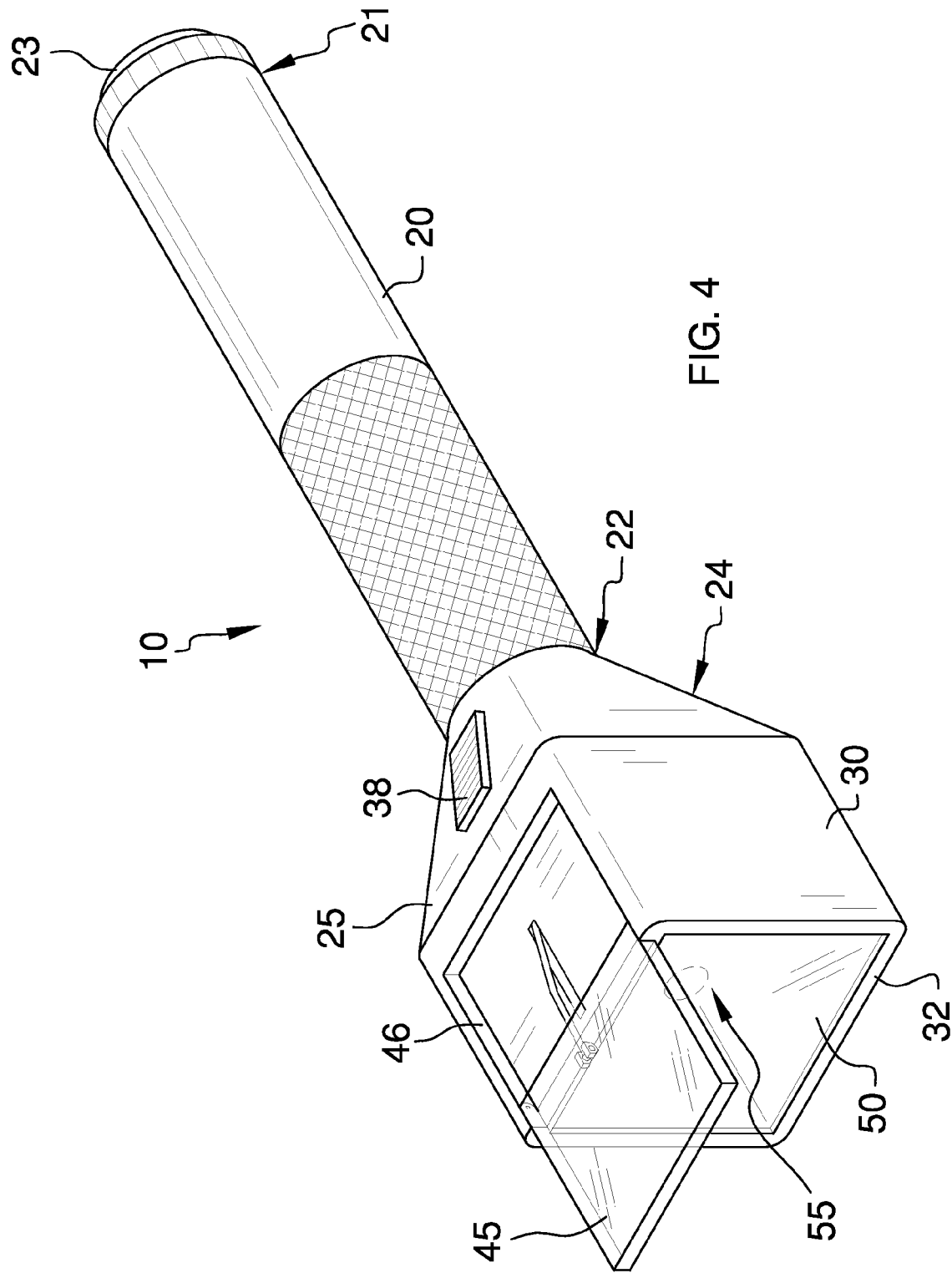
FIG. 4 is a top perspective view with magnifying lens rotated a full 180 degrees forward from the lens bed.

Referring to FIGS. 4 and 7D, the nodules 39b and indents 39a are engaged with the thumb slide 38 in the fully forward position, thereby positioning the magnifying lens 45 a full 90 degrees forward of vertical, or 180 degrees forwardly pivoted from the lens bed 46.

With respect to the above description then, it is to be realized that the optimum dimensional relationships for the parts of the magnifying lensed flashlight apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the magnifying lensed flashlight apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the magnifying lensed flashlight apparatus may be used.

Therefore, the foregoing is considered as illustrative only of the principles of the magnifying lensed flashlight apparatus. Further, since numerous modifications and changes will readily occur to those skilled in the art, it is not desired to limit the magnifying lensed flashlight apparatus to the exact construction and operation shown and described, and accordingly, all suitable modifications and equivalents may be resorted to, falling within the scope of the magnifying lensed flashlight apparatus.

What is claimed is:

1. A magnifying lensed flashlight apparatus, comprising, in combination:
   a cylinder having a first end, a second end, a power source within;
   a removable switch cap disposed on the cylinder first end;
   a neck connected to the second end;
   an expanded rectangle connected to the neck;
   a rectangular sleeve connected to the expanded rectangle, the sleeve having a top;
   a rectangular perimeter face disposed most forwardly around the sleeve;
   a rectangular light lens disposed forwardly within the sleeve;
   a light source disposed behind the light lens, the light source in communication with the cylinder with power source;
   a rectangular lens bed disposed within the sleeve top;
   a rectangular magnifying lens pivotally and removably disposed within the lens bed, the magnifying lens having a lens front and a lens back;
   a lever post disposed downwardly and centrally on the lens back;
   a longitudinal slot disposed within the neck;
   a plurality of spaced apart indents disposed downwardly in the neck, the indents disposed both forward and aft of the slot;
   a thumb slide slideably disposed above the slot;
   a connection arm disposed downwardly and centrally from the thumb slide and through the slot, the connection arm perpendicular to the thumb slide;
   a lower slide disposed perpendicularly on the connection arm, the lower slide disposed below the slot;
   a plurality of nodules disposed upwardly on the lower slide, the nodules selectively engaged within the indents, whereby the thumb slide resists inadvertent movement with nodules engaged within indents;
   a rod extended forwardly from the connection arm, the rod connected below the lower slide, the rod further pivotally connected to the magnifying lens hinge;
   a rod bend disposed within the rod, the rod bend proximal to the hinge;
   whereby fore and aft movement of the thumb slide pivots the magnifying lens from a position within the lens bed to a position 180 degrees forwardly from the lens bed.

2. The apparatus according to claim 1 wherein the nodules and indents further selectively dispose the magnifying lens progressively in a position within the lens bed, 90 degrees pivoted upwardly from the lens bed, 135 degrees upwardly and forwardly from the lens bed, and 180 degrees forwardly from the lens bed.

* * * * *